INVENTORS
NILS A. N. BJÖRK
SVEN-BERTIL BORG

BY Larson and Taylor

ATTORNEYS

United States Patent Office 3,430,045
Patented Feb. 25, 1969

3,430,045
OPTICAL SCANNING BY MEANS OF INFRA-RED RADIATION
Nils Arvid Norman Björk, Enebyberg, and Sven-Bertil Borg, Rydbo, Sweden, assignors to AGA Aktiebolag
Filed June 13, 1966, Ser. No. 557,193
Claims Priority, application Sweden, June 16, 1965, 7,909/65
U.S. Cl. 250—83.3
Int. Cl. G01t *1/16;* G01b *15/04;* H01j *29/52*
11 Claims

ABSTRACT OF THE DISCLOSURE

An apparatus and a method for optical scanning with infra-red radiation. The system includes a detector which scans a field of view, a luminosity image producing device, a mechanism for selecting a desired voltage range representing a selected temperature range of the view to be displayed and a series of amplifying stages connecting the detector and the image producing device. A voltage level responsive device is connected to a first point in the series of amplifying stages and is responsive to a narrow voltage range around a selected voltage level at the said first point. A control signal is thus generated and applied to a later point in the series of amplifying pages to momentarily increase the brightness at a corresponding point in the image.

---

Figure 1:
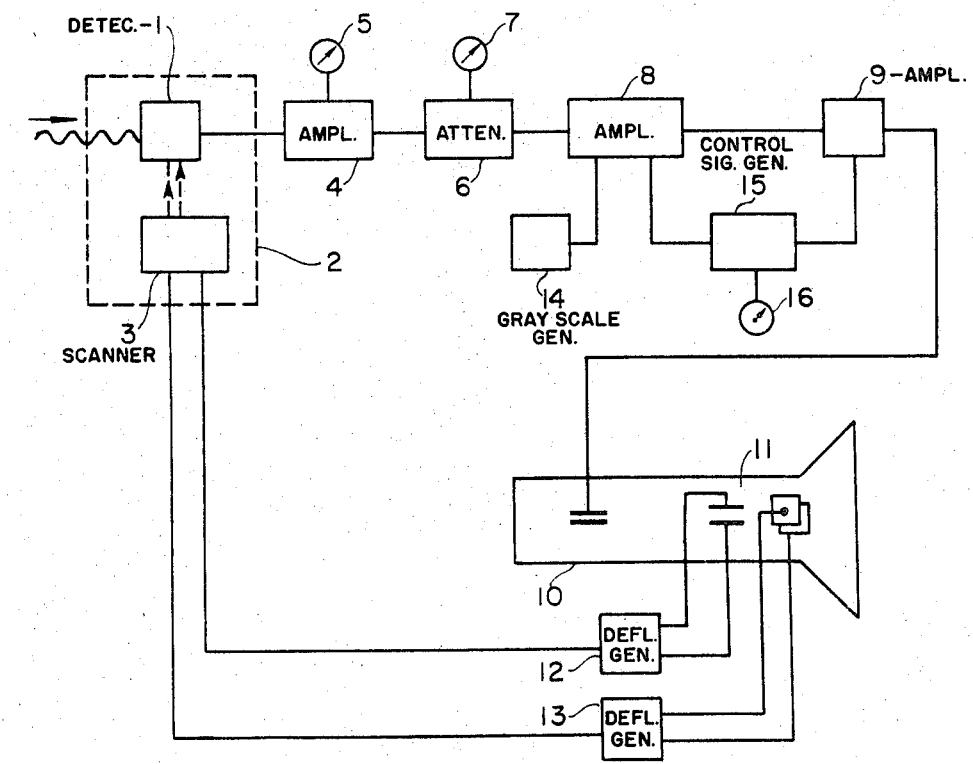

This invention relates to optical scanning by means of infra-red radiation, and, more particularly it relates to a method and apparatus in which temperature measurements of selected portions of a scanned field may be directly and immediately ascertained.

Apparatus for scanning a field of view by means of infra-red radiation usually comprises an infra-red detector and a means for causing radiation from different portions of the field to be supplied successively by an optical-mechanical scanning device to the detector. The detector is usually connected to an image producing device such as a cathode ray tube or a photographic film scanned by a modulated light by way of a series of amplifying stages connected between the detector and the image producing device.

In previous apparatus of this general type an image is provided representing all temperatures throughout the field scanned, wherein the portions of the scanned field having a higher temperature are reproduced in the image as lighter areas and the portions of the field having a lower temperature are reproduced as darker areas.

Thus, the image contains areas of varying brightness and to ascertain the temperature existing at a given portion of the scanned field it has been necessary to make measurements of the brightness of the said given portion of the image. However, this method has proved less than satisfactory. It is time-consuming and requires special measuring equipment for ascertaining the temperature that exists at the moment of exposure at a certain point in the scanned field.

The present invention overcomes the disadvantages of the previous optical scanning devices. According to the present invention, a means is provided for producing an image representing a certain pre-selected narrow temperature range said image being produced at one bright luminosity level which is sharply contrasted to the remainder of the image.

Briefly, according to the present invention, there is connected to a point in the series of amplifying stages between the detector and the image producing device, a voltage-level responsive device which is adapted to generate a control signal in response to the presence in the amplifying stages of a voltage within a certain narrow voltage range representing a certain narrow temperature range in the field being observed by the detector. This signal is then applied to a later point in the series of amplifying stages, for example, to the control grid of an amplifier, to cause a momentary increase in the brightness of the corresponding point in the image.

The invention also includes a means for adjusting the said device to pre-select both the level and the width of the temperature range to which the device will respond, and a means for displaying the pre-selected temperature range in the image.

Thus, it is an object of this invention to provide an optical scanning method and apparatus of the type referred to which overcomes the disadvantages of previous optical scanning apparatus.

It is another object of this invention to provide an optical scanning method and apparatus which will provide at one high brightness level an image of the area of the scanned field having the pre-selected temperautre, which image is sharply contrasted to the remainder of the image.

Figure 2:
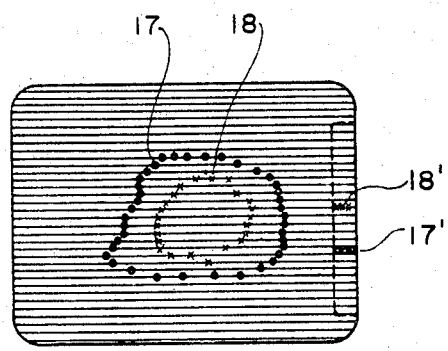

Other objects and the attendant advantages of the present invention will become apparent by the detailed description to follow together with the accompanying drawings in which:

FIGURE 1 is a block diagram of an apparatus according to the present invention,
FIGURE 2 is a schematic view illustrating the type of image obtained.

Referring now to FIGURE 1, a detector 1 which is responsive to infra-red radiation, is shown receiving infra-red radiation. See the arrow and wavy line to the left of the detector 1 in FIGURE 1. The detector is mounted in a scanning camera 2 which co-operates with an optical-mechanical scanning device 3 of a type known per se to cause the radiation from different points of a scanned field to be supplied successively to the detector 1, whereby an image-type scanning of the field is obtained.

The detector output, is amplified in an amplifier 4, which may be provided with a voltmeter 5 indicating the average voltage level of the amplifier input. This voltage level is a measure of the average temperature of the scanned field. The amplifier 4 is so designed that to the signal can be added a constant but variable voltage thereby selecting a desired voltage range, to be amplified by the following stages said voltage range representing a selected temperature range, of the view to be displayed. The amplifier 4 may be connected to a variable attenuator 6, by means of which the sensitivity of the apparatus can be varied. For example, the attenuator 6 would be used to establish the full desired temperature range of the scanned field to be observed. The selected sensitivity of the attenuator 6 can be indicated by a sensitivity indicating instrument 7. Connected to the attenuator 6 is an additional amplifier 8 the output of which is a variable DC voltage. This DC voltage is amplified in a DC amplifier 9 after which it modulates the intensity of the image providing beam in a tube 10 which forms the image producing device. The image tube 10 is provided with customary deflection members 11 which are controlled by deflection generators 12 and 13 of the usual type in synchronism with the scanning performed by the camera 2, this operation being controlled by voltages generated in the scanning device 3. Also connected to the amplifier 8 is a unit 14 of a type known per se for generating a gray scale in the reproduced image, preferably along one of the borders thereof. This scale shows the full desired temperature range established at attenuator 6 wherein the temperatures within the said range are represented by areas of different brightness on the screen. The member 14 can be constructed to give a linearly rising voltage, which will, after amplification thereof, produce a gray scale in the form of a number of lines of linearly increasing brightness in which the lower brightness end of the scale represents the cooler end of the said range and the higher brightness end of the scale represents the hotter end of the said range. The line may be placed adjacent a temperature scale to indicate the temperature represented by a given level of brightness. Through suitable synchronization with the scanning device, this gray scale can be positioned at one of the borders of the image.

The apparatus, as hereinabove described, operates in a manner previously known to reproduce on the screen of the image tube an image of the scanned field of view in which a higher luminosity on the screen represents a higher temperature at the corresponding point in the field being scanned. To evaluate the temperature value at any given point in the field of view, as stated above, the reproduced image can be photographed and a density measurement performed at the corresponding point o fthe photograph. Alternatively, the temperature at any given point may be estimated by comparing the brightness at that point on the image screen with a portion of the gray scale having the same brightness. However, it is apparent that this estimation is at best, only an uncertain and unreliable approximation because of the distance between the point on the screen, the intensity of which is to be determined, and the corresponding point on the gray scale.

In order to make it possible to determine the temperature immediately and with greater accuracy, according to the present invention, there is connected to the amplifier 8 a voltage-level responsive device 15 adapted to respond to a certain pre-selected voltage level at the point in the amplifying chain to which the device is connected. When current at the preselected voltage is applied to the device 15 the device generates a control signal which is applied to the DC amplifier 9 to cause a momentary increase in the current transmitted to the tube 10 to increase the brightness on the image screen at the screen position corresponding to the point of the field of view being scanned at that particular moment. The characteristics of the device 15 and/or the amplifier 9 may be such that sufficient current to provide any illumination at all on the image tube screen may be provided only when the current supplied to the amplifying chain is within a preselected but variable narrow range representing the narrow preselected temperature range within the full temperature range established at attenuator 6. The voltage-level responsive device 15 is provided with an adjuster 16 for varying and indicating the voltage level and the range to which the device 15 will respond to transmit a control signal to the DC amplifier 9.

Devices which respond to predetermined voltage levels are known per se and may comprise, for example, an adjustable potentiometer for taking off a predetermined reference voltage to be compared with the voltage at the abovementioned point in the amplifying chain. When, therefore, the latter voltage deviates less than a preselected amount from the reference voltage, there is generated in a well-known manner a control voltage which is applied for controlling the DC amplifier 9. For example, the control voltage may control the grid of the amplifier 9.

The points of increased brightness produced on the tube screen in this manner will represent all points, in the field being scanned within the selected narrow temperature range within the larger range established by attenuator 6. A line connecting these points can therefore be considered as an isotherm for portions of the field having the given temperature. It is possible to select the persistence of phosphorescence of the screen so as to make a connected line appear thereon. This is indicated schematically in FIGURE 2, where line 17 is formed from points having the same temperature. By adjusting the reference voltage level of the device 15, there are reproduced on the screen points of increased luminosity corresponding to other portions of the field scanned, whereby an isotherm 18 for another temperature is reproduced on the screen. If the gray scale is also reproduced at one of the image borders, the portions of the gray scale inside the voltage range to which the device 15 responds will produce either a line 17' or a line 18' with increased brightness which lines indicate the voltage (temperature) to which device 15 is set to respond. The temperature represented by that line can be read on a numerical temperature scale placed adjacent the gray scale at the edge of the screen in the usual manner. If the image is photographed, it is possible in this manner to ascertain for future reference the voltage level to which the device 15 was set and thus the isotherm which is shown on the photograph.

For a complete mapping of an object, a series of photographs may be taken with different adjustment of the device 15 corresponding to certain desired isotherms.

The invention has been described in considerable detail with particular reference to a preferred embodiment thereof. However, it should be apparent that variations and modifications can be effected within the spirit and scope of the invention as described hereinabove, limited only by the appended claims wherein:

We claim:
1. An apparatus for optical scanning by means of infra-red radiation comprising, a detector, a means for causing the detector to scan a field of view, a luminosity image producing device, a means for selecting a desired voltage range representing a selected temperature range of the view to be displayed and a series of amplifying stages connecting the detector and the image producing device, the improvement comprising: a voltage level responsive device connected to a first point in the said series of stages, said device responsive to a narrow voltage range around a selected voltage level at the said first point of the series of stages within the said desired voltage range to generate a control signal and to apply the control signal to a later point in the series of stages thereby causing a momentary increase in the brightness at a corresponding point in the image.

2. An apparatus according to claim 1, including means for varying the voltage level and the narrow voltage range to which the level responsive device will respond to generate a control signal.

3. An apparatus according to claim 2, wherein the voltage level responsive device adjusting means is graduated in degrees temperature.

4. An apparatus according to claim 1, wherein the said series of amplifying stages includes between the said first point in the series of stages and the image producing device a means for providing pure DC voltage amplification, and wherein a preselected DC voltage at the said first point corresponds to a certain temperature level at a corresponding point of the field being scanned.

5. An apparatus according to claim 4, wherein the said image producing device comprises a cathode ray tube having a screen with a phosphorescence material, the persistence of the phosphorescence of the image screen being sufficient to make points of the same temperature, for which a momentary increase in luminosity has occurred during the scanning of the field of view, appear as an area representing an isotherm for a given temperature.

6. An apparatus according to claim 1 including a means connected to said series of amplifying stages for producing a gray scale in the reproduced image.

7. An apparatus according to claim 6, wherein a gray scale is produced at one border of the reproduced image.

8. A method of thermographically analyzing a field to produce an image representing the temperature of the field comprising the steps of:
(a) Scanning a field with an infra-red detector which converts infra-red light waves to electrical signals of a magnitude dependent upon the intensity of the received infra-red light waves, (b) Selecting a desired voltage range of the signal converted by the detector which represents a desired temperature range of the field, (c) Amplifying the signal within the desired voltage range, (d) Transmitting the amplified signal to an image producing device to produce an image of the field wherein the brightness of the image at any point in the image is dependent upon the temperature of the corresponding portion of the field, (e) Selecting a narrow voltage range around a voltage level within the said desired range representing a certain narrow temperature range in the scanned field, and (f) Allowing signals within said narrow voltage range to produce a superimposed image of high brightness.

9. A method of thermographically analyzing a field to produce an image representing the temperature of the field comprising the steps of:

(a) Scanning a field with an infra-red detector which converts infra-red light waves to electrical signals of a magnitude dependent upon the intensity of the received infra-red light waves, (b) Selecting a desired voltage range of the signal converted by the detector which represents a desired temperature range of the field, (c) Amplifying the signal within the desired voltage range, (d) Transmitting the amplified signal to an image producing device to produce an image of the field wherein the brightness of the image at any point in the image is dependent upon the temperature of the corresponding portion of the field, (e) Selecting a narrow voltage range around a voltage level within the said desired range representing a certain narrow temperature range in the scanned field, (f) Suppressing signals outside said narrow voltage range and (g) Allowing only signals within said narrow voltage range to produce an image on the image producing device.

10. A method as claimed in claim 8, including the step of selecting additional voltage levels within the said desired range, one at a time, and producing an image of the temperature represented by each selected voltage level on the screen.

11. A method as claimed in claim 9, including the step of selecting additional voltage levels within the said desired range, one at a time, and producing an image of the temperature represented by each selected voltage level on the screen.

References Cited

UNITED STATES PATENTS

| | | | | |
|---|---|---|---|---|
| 3,076,189 | 1/1963 | Goddard | | 343—6 |
| 3,076,961 | 2/1963 | Bibbero | | 343—6 |

RALPH G. NILSON, *Primary Examiner.*

S. ELBAUM, *Assistant Examiner.*

U.S. Cl. X.R.

73—355; 178—7.7